(12) United States Patent
Thomas et al.

(10) Patent No.: US 10,080,361 B2
(45) Date of Patent: Sep. 25, 2018

(54) GAME CALLING DEVICE HAVING ADJUSTABLE SOUND AND METHOD FOR USING

(71) Applicant: Hunters Specialties, Inc., Cedar Rapids, IA (US)

(72) Inventors: Scott Thomas, Marion, IA (US); Ron Bean, Cedar Rapids, IA (US); Jesse Kruska, Wallingford, CT (US); Garrett Fink, Glastonbury, CT (US); David Schweitzer, Weston, CT (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 14 days.

(21) Appl. No.: 15/248,645

(22) Filed: Aug. 26, 2016

(65) Prior Publication Data

US 2017/0055519 A1   Mar. 2, 2017

Related U.S. Application Data

(60) Provisional application No. 62/210,824, filed on Aug. 27, 2015.

(51) Int. Cl.
*A63H 5/00* (2006.01)
*A01M 31/00* (2006.01)

(52) U.S. Cl.
CPC ................................ *A01M 31/004* (2013.01)

(58) Field of Classification Search
CPC .................................................. A01M 31/004
USPC ................ 446/202, 205, 207, 208, 397, 416
See application file for complete search history.

(56) References Cited

U.S. PATENT DOCUMENTS

| | | | | |
|---|---|---|---|---|
| 2,544,370 | A | * | 3/1951 | Walther .................. G10D 7/12 446/208 |
| 2,608,796 | A | | 9/1952 | Bicocchi |
| 2,737,757 | A | | 3/1956 | Liebelt |
| 4,034,499 | A | * | 7/1977 | Wild ........................ A63H 5/00 446/215 |
| 4,915,660 | A | * | 4/1990 | Overholt, Sr. ....... A01M 31/004 446/207 |
| 4,940,451 | A | * | 7/1990 | Leady ................. A01M 31/004 446/202 |
| 5,643,039 | A | * | 7/1997 | McIntyre ............ A01M 31/004 446/208 |
| 5,910,039 | A | | 6/1999 | Primos |
| 5,975,978 | A | * | 11/1999 | Hall .................... A01M 31/004 446/208 |
| 6,053,794 | A | | 4/2000 | Weiser |

(Continued)

*Primary Examiner* — Kurt Fernstrom
(74) *Attorney, Agent, or Firm* — Conley Rose PC

(57) ABSTRACT

An animal call which generally includes a housing having a first portion rotatably combined with a second portion. An opening is formed in a wall of the housing between a mouthpiece and an outlet end. A reed is disposed within the opening and is adapted to vibrate in response to passing air. The reed is combined with the first housing portion. A helical member is formed inside the second housing portion. An adjustment member has a helical engagement member that engages the helical member. The adjustment member includes an adjustment arm in frictional engagement with the reed. The helical member acts as an auger to move the adjustment member along the length of the reed as the second housing portion is rotated relative to the first housing portion.

20 Claims, 14 Drawing Sheets

(56) References Cited

U.S. PATENT DOCUMENTS

| | | | |
|---|---|---|---|
| 6,106,357 A | 8/2000 | Weiser | |
| 6,152,798 A * | 11/2000 | Raburn | A01M 31/004 446/207 |
| 6,234,860 B1 * | 5/2001 | Cook | A01M 31/004 446/207 |
| 6,527,614 B1 * | 3/2003 | Primos | A01M 31/004 446/207 |
| 6,547,627 B1 | 4/2003 | Oathout | |
| 6,575,804 B1 | 6/2003 | Primos | |
| 7,011,563 B2 | 3/2006 | Ady | |
| 7,070,473 B1 * | 7/2006 | Cassette | A01M 31/004 446/207 |
| 7,083,492 B1 | 8/2006 | Morocco | |
| 7,637,795 B1 * | 12/2009 | Dukart | A01M 31/004 446/207 |
| 9,017,135 B2 | 4/2015 | Oathout | |
| 9,326,499 B1 | 5/2016 | Gant | |
| 2005/0079789 A1 | 4/2005 | Bishop | |
| 2009/0017717 A1 | 1/2009 | Marini | |
| 2009/0258566 A1 | 10/2009 | May | |
| 2012/0156959 A1 | 6/2012 | Kennedy | |

\* cited by examiner

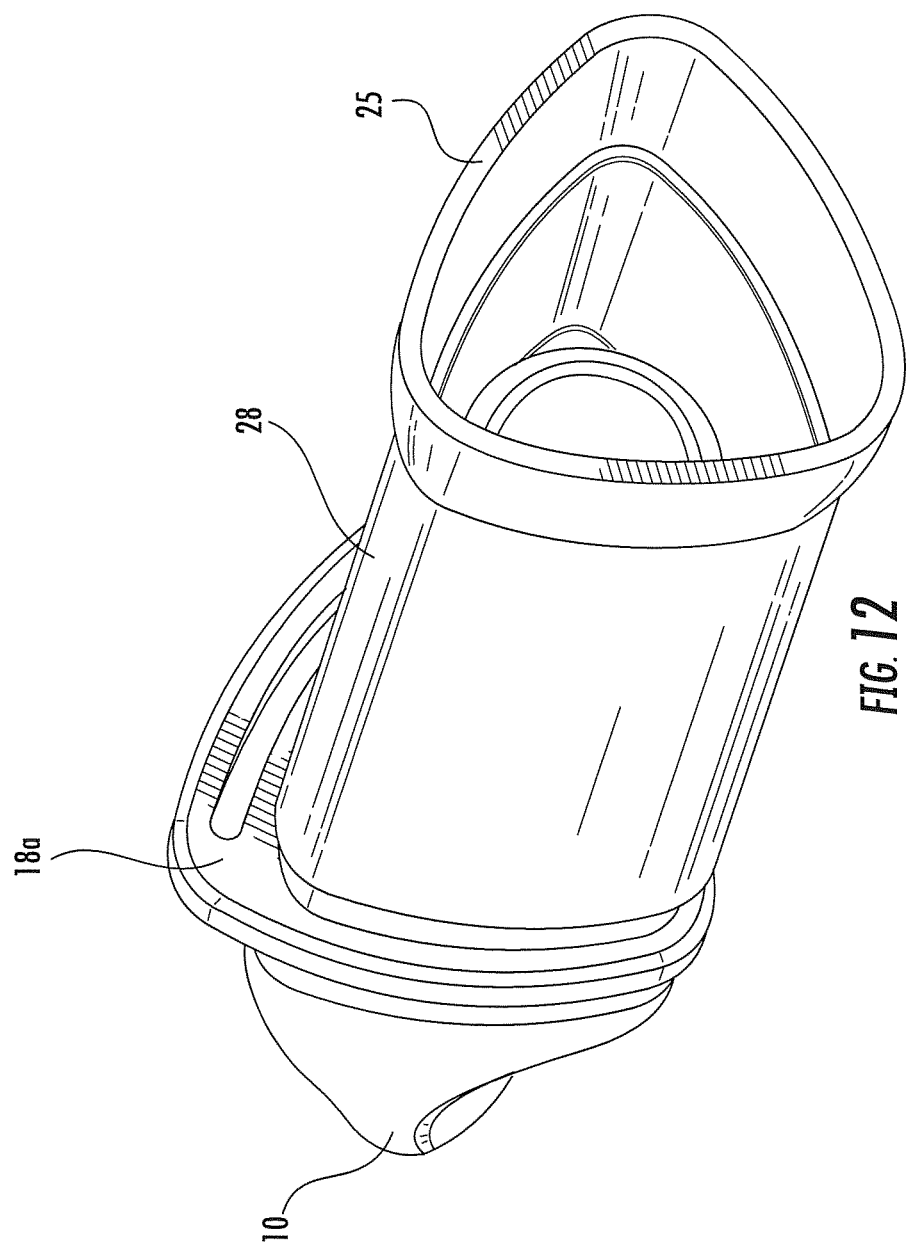

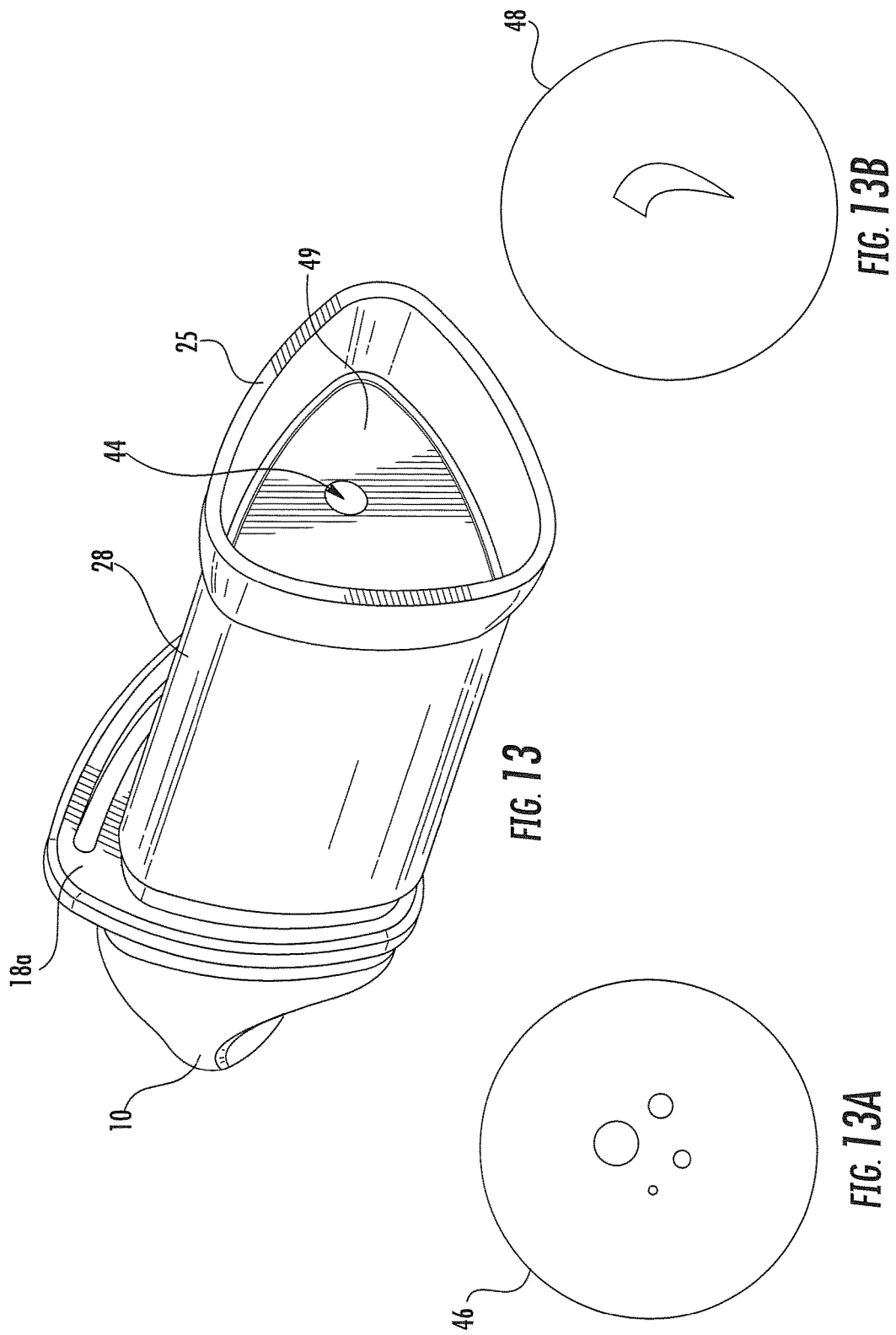

GAME CALLING DEVICE HAVING ADJUSTABLE SOUND AND METHOD FOR USING

CROSS-REFERENCE TO RELATED APPLICATION

The present invention claims priority to Provisional Patent Application Ser. No. 62/210,824, filed Aug. 27, 2015, the disclosure of which is hereby expressly incorporated by reference.

BACKGROUND

The present invention relates to game calling devices, and in particular, to an adjustable grunt tube that can produce sounds having varied pitch, intensity, tone and inflection.

Game calling devices for large mammals and predators are known. In particular, devices known as "grunt tubes" are used to simulate the grunts, snorts, bleats and other sounds produced by white-tailed deer. Hunters and wildlife enthusiasts use grunt tubes to attract deer and other animals.

Grunt tubes generally include a tubular member through which air passes and a reed supported within the tubular member. The passing air excites the reed causing it to vibrate and produce sounds. Some grunt tubes allow the user to vary the sounds produced by the calling device. In one existing device the sound is varied by adjusting the position of an o-ring along the length of the reed. One problem with this device is that the o-ring can be difficult for the user to access since the reed/o-ring assembly is positioned inside the central housing of the device. Another problem with this device is that it can be difficult for the o-ring to make contact all the way around the circumference of the reed which can hinder the reed's vibration and distort the sound. Yet another problem with this device is that the o-ring requires periodic lubrication to prevent it from drying out.

There is therefore a need for an improved grunt tube which overcomes these and other disadvantages in the prior art.

SUMMARY

One aspect of the invention relates to an animal call device commonly referred to as a grunt tube. The grunt tube generally includes a housing having a first portion rotatably combined with a second portion. An opening is formed in a wall of the housing between a mouthpiece and an outlet end. A reed is disposed within the opening and is adapted to vibrate in response to passing air. The reed is combined with the first housing portion. A helical member is formed inside the second housing portion. An adjustment member has a helical engagement member that engages the helical member. The adjustment member includes an adjustment arm in frictional engagement with the reed. The helical member acts as an auger to move the adjustment member along the length of the reed as the second housing portion is rotated relative to the first housing portion.

Another aspect of the invention relates to an animal call device commonly referred to as a grunt tube. The animal call generally includes an elongated housing, a reed, and an adjustment member. The housing includes a mouthpiece end that allows air to enter the tubular member, an outlet end that emits sounds, and an opening in a wall of the tubular member between the mouthpiece end and the outlet end. The mouthpiece end is rotatably combined with a second portion of the housing. The reed is combined with the second portion of the housing and vibrates in response to passing air. An adjustment member has an adjustment arm which engages the reed. The adjustment member includes a helical engagement member that engages a helical member on the inside surface of the second portion of the housing. The helical member acts as an auger to move the adjustment member along the length of the reed as the second housing portion is rotated relative to the first housing portion. A user can modify the sounds emanating from the outlet end by rotating the mouthpiece end relative to the housing second portion to change the position of the adjustment member along the length of the reed which changes the vibrational characteristics of the reed. Some embodiments include an expandable member which is made from a flexible and elastic material thereby allowing, it to have a first position wherein it is nested inside the housing and a second position wherein a portion extends outside of the housing. In one embodiment the expandable member is biased in its first position so that it retracts inside the housing when the user no longer exerts a pulling force on the outlet end.

Another aspect of the invention relates to a method of using an animal call. The animal call generally includes an elongated housing having a mouthpiece end and an outlet end, a reed, and an adjustment member having an adjustment arm in frictional engagement with the reed. The method includes passing air into the mouthpiece end of the housing as is known in the art. The reed vibrates in response to the passing air to create an audible sound which is emitted from the outlet end of the device. The sound emanating from the outlet end is modified by rotating a first portion of the housing relative to a second portion of the housing to change the position of the adjustment member along the length of the reed from a first reed contact point to a second reed contact point. Some embodiments include an expandable member. The expandable member has a first position wherein it is nested inside the housing and a second position wherein a portion extends outside of the housing. The expandable member is biased in its first position so that it retracts inside the housing when the user no longer exerts a pulling force on the outlet end. The expandable member may be moved to its extended position to increase the distance between the mouthpiece end and the outlet end which modifies the sound emitted. In its extended position the expandable member may be bent or flexed to modify the direction of sound emitted from the outlet end.

BRIEF DESCRIPTION OF THE DRAWINGS

FIG. 12 is a perspective view showing an embodiment wherein the opening in the outlet end approximates the size and shape of the housing.

FIG. 13 is a perspective view showing an embodiment wherein the size of the opening in the outlet end is reduced.

FIG. 13a is a front view of a plate member used to adjust the size of the outlet opening.

FIG. 13b is a front view of an alternate embodiment of a plate member used to adjust the size of the outlet opening.

DETAILED DESCRIPTION

Figure 1:
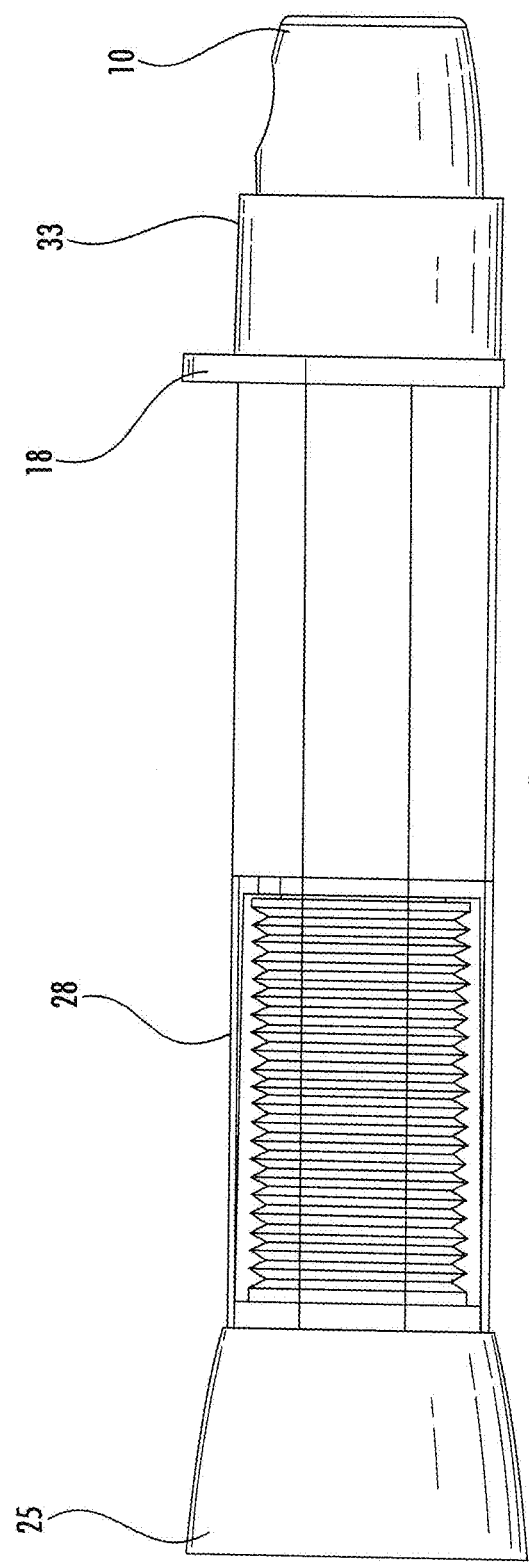
FIG. 1 is a side view of an embodiment of the grunt tube.
Figure 2:
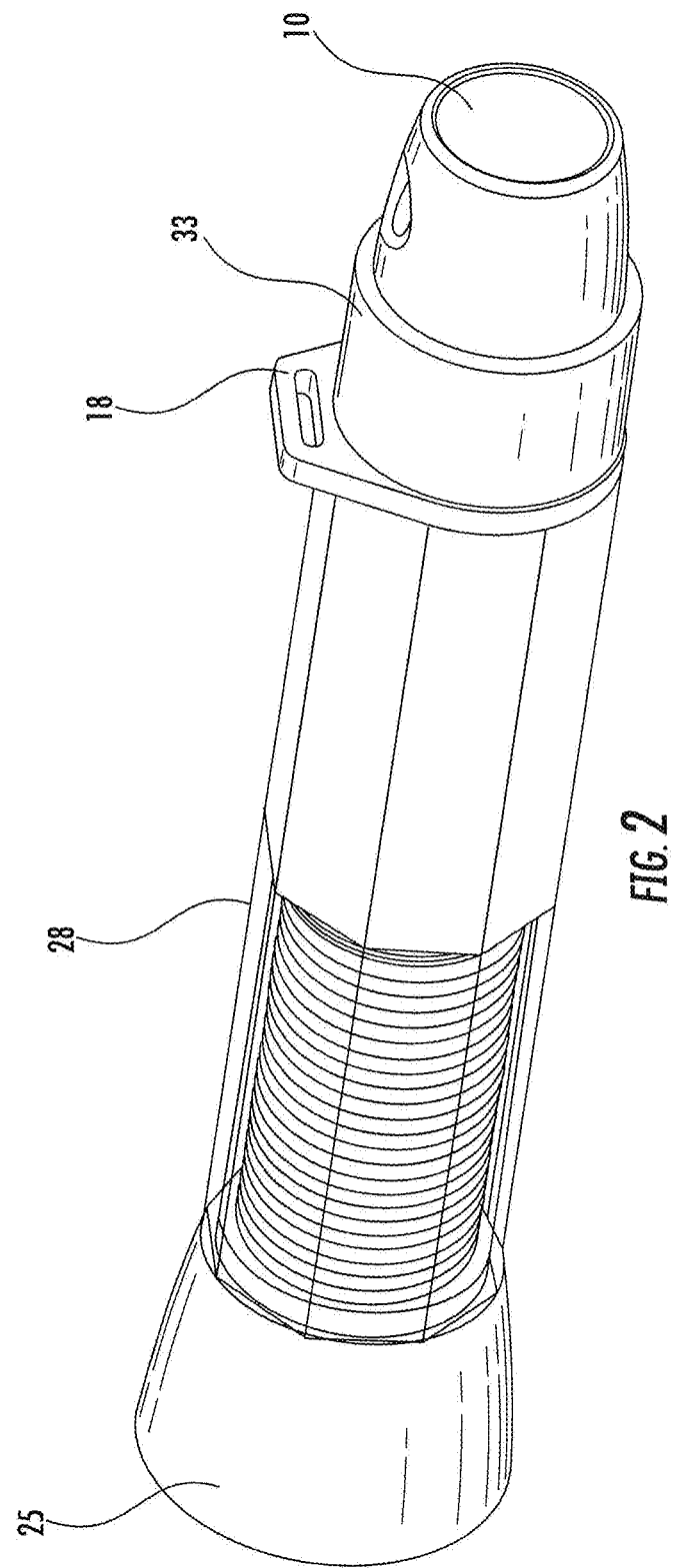
FIG. 2 is a perspective view of an embodiment of the grunt tube.
Figure 4A:
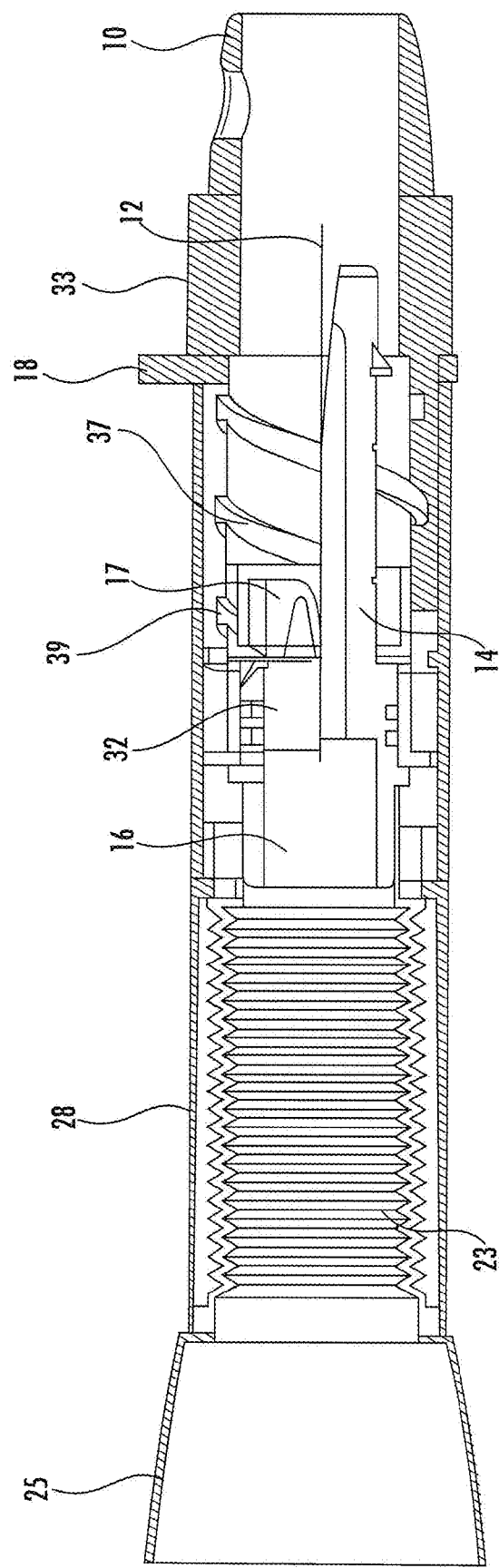
FIG. 4a is a side section view of an embodiment of the grunt tube.

FIGS. 1 and 2 show a side view and a perspective view, respectively, of an embodiment of the game calling device/grunt tube. With further reference to FIG. 4a, the device generally includes a first housing portion 28, a second housing portion 33, a reed 12 combined with the first housing portion 28, and an adjustment member 17 movable inside the second housing portion 33. In one embodiment, the first hosing portion 28 and second housing portion 33 are combined together (as described in more detail below) and rotate relative to each other. The second housing portion 33 includes or may be combined with a mouthpiece 10 at one end which allows air to enter the device. The first housing portion 28 includes or may be combined with an outlet 25 at the other end of the device which emits sounds. As used herein, "upstream" is toward the mouthpiece 10 and "downstream" is toward the outlet 25. An opening in a wall of the housings 28, 33 extends between the mouthpiece 10 and the outlet 25 to allow air to pass through the length of the device. The housings 28, 33 may be made of any suitable material. In one embodiment the housings 28, 33 are made from a solid material such as hard plastic polymer. The housings 28, 33 can be any suitable shape, including tubular and rectangular prism.

Figure 3:
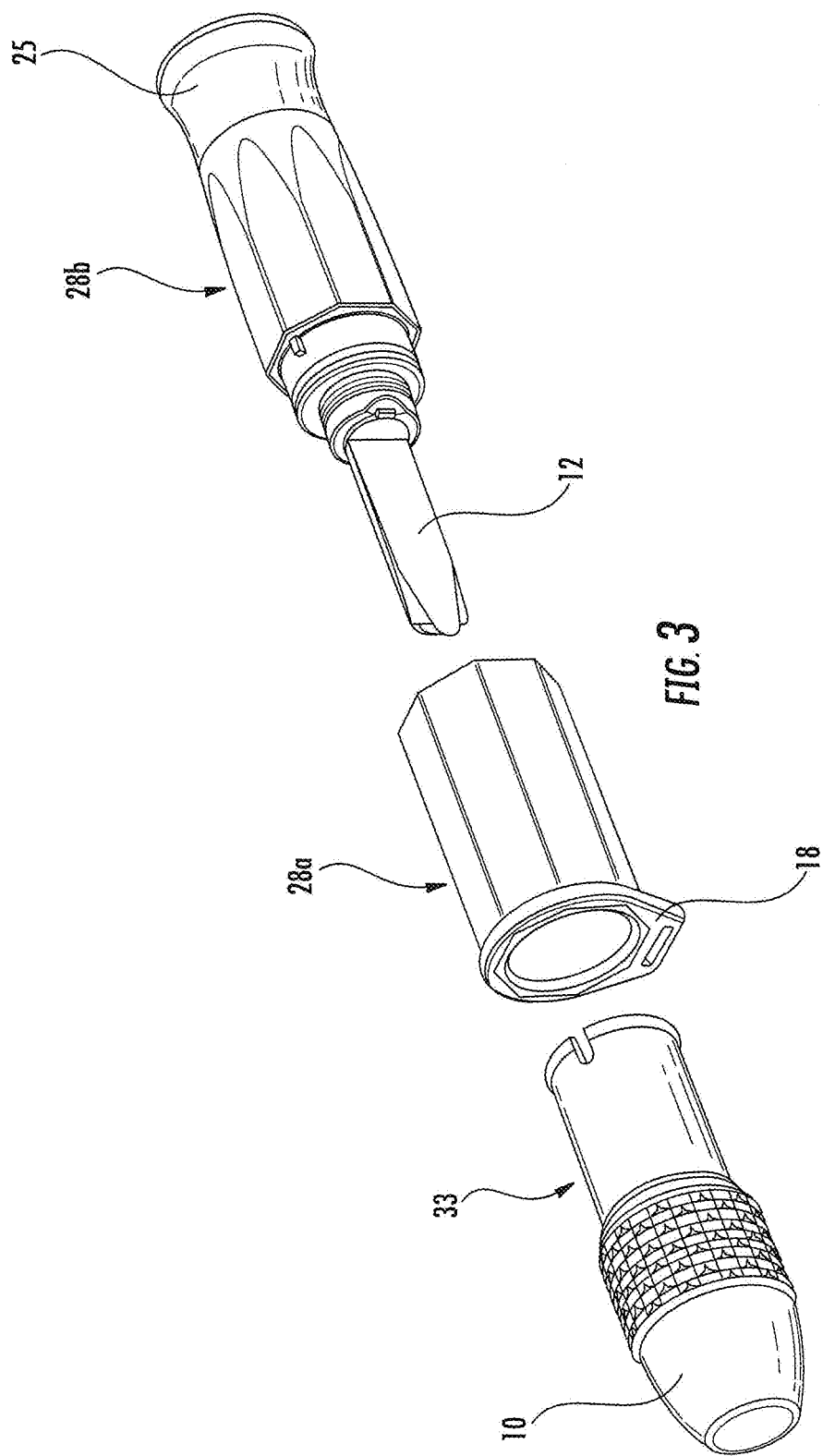
FIG. 3 is an exploded of an embodiment of the grunt tube showing the first housing portion separated from the second housing portion, wherein the first housing portion has two separate sections.

FIG. 3 shows an exploded view wherein the first housing portion 28 is separated from the second housing portion 33 and the first housing portion 28 has two separate sections 28a, 28b. In this embodiment, section 28a of the first housing portion 28 is removably combined with section 28b of the first housing portion 28 to provide the user with easy access to the internal components, such as the reed 12. The two sections 28a, 28b may be combined in any suitable manner, such as by a friction fit.

Figure 4B:
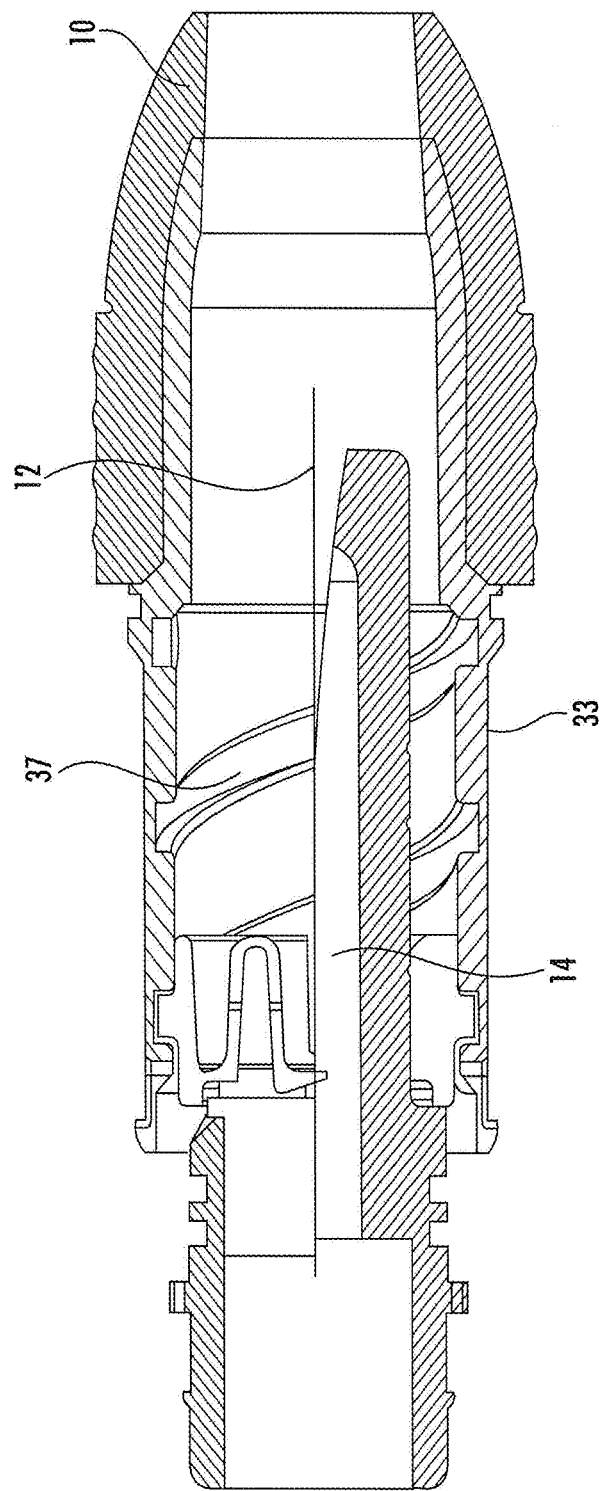
FIG. 4b is a side section view of an embodiment of the grunt tube.
Figure 6:
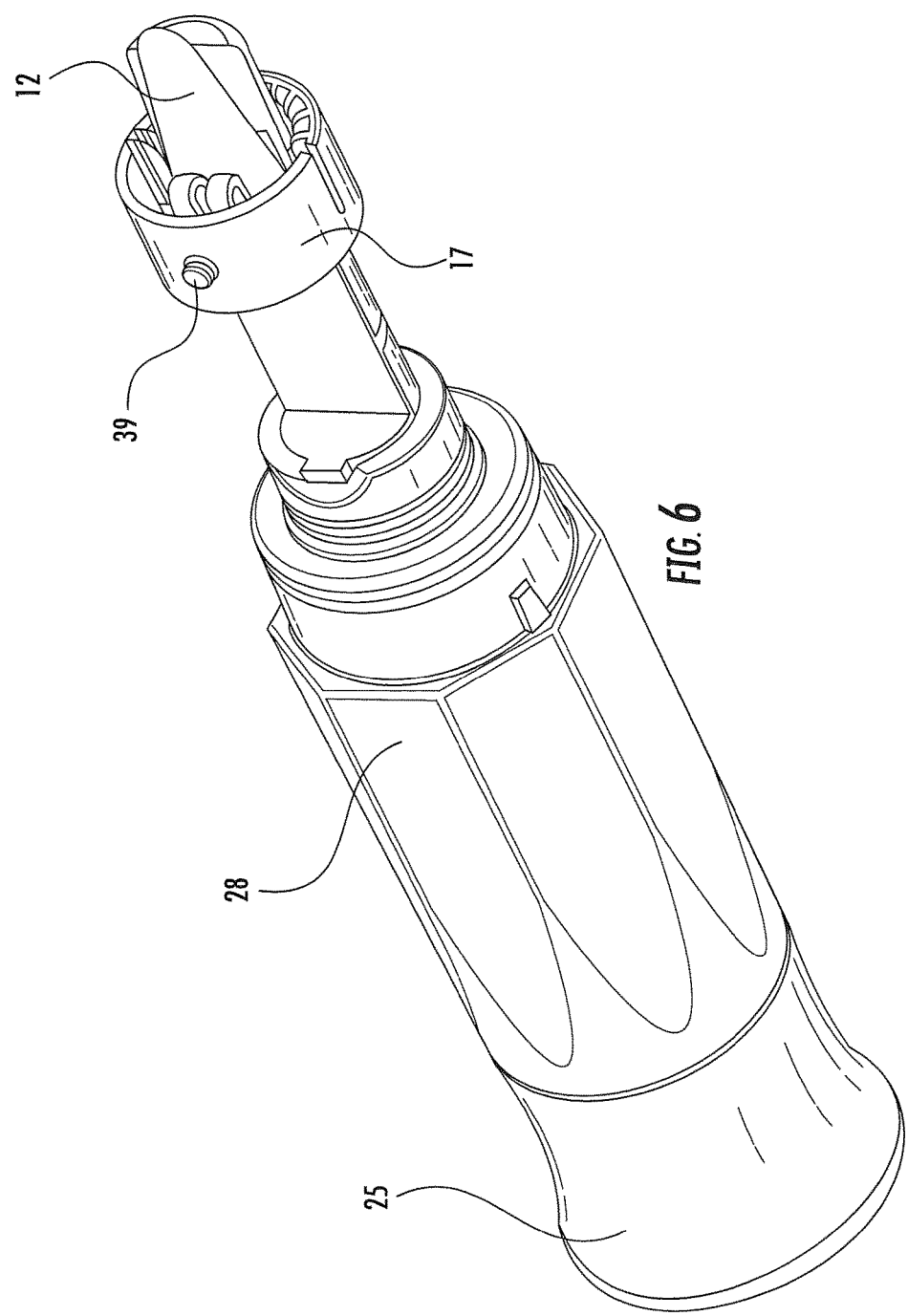
FIG. 6 is a perspective view of an embodiment wherein the second housing portion has been removed to show the internal components.

In one embodiment, the reed 12 is combined with the first housing portion 28 and extends toward the mouthpiece 10 opening as shown in FIG. 6 and at least partially within the second housing portion 33. The reed 12 is a thin strip of a flexible material, such as, e.g., plastic or MYLAR. As known in the art, the dimensions of the reed 12 and the material of which it is made are determined according to the sound characteristics that the user desires to produce with the grunt call. The reed 12 is supported by a sound board 14 (FIGS. 4a and 4b) having at least a first and second side and a reed support member 16. In some embodiments the sound board 14 and support member 16 are molded together as one piece. A removable wedge 32 may be used to secure the reed 12 to the first side of the sound board 14. After the reed 12 is positioned adjacent to the sound board 14, the wedge 32 is placed on the downstream portion of the reed 12 and forced into an opening having a size and shape approximately the same as the wedge 32. The wedge 32 is frictionally secured in the opening to hold the reed 12 against the sound board 14. In some embodiments the opening or wedge 32 may be tapered so the friction between the wedge 32 and the walls of the opening increases as the wedge 32 is pushed farther into the opening.

In some embodiments, the length of the sound board 14 is shorter than the length of the reed 12 to help slow down the reed's 12 vibrations. In other embodiments the reed 12 is longer than the sound board 14. Depending upon the desired sound characteristics, however, different sound board 14 configurations can be used. The sound board 14 preferably includes an upstream end disposed adjacent the mouthpiece 10 which is tapered to be thinner than the downstream end thereby allowing the upstream portion of the reed 12 to be suspended away from the sound board 14. The reed 12 preferably includes an upstream end that is also disposed adjacent the mouthpiece 10 and a downstream end. The downstream end of the reed 12 is connected to the downstream end of the sound board 14 as described above. The upstream end of the reed 12 is free to vibrate away from the sound board 14, subject to the position of the adjustment member 17 as described below.

Figure 7:
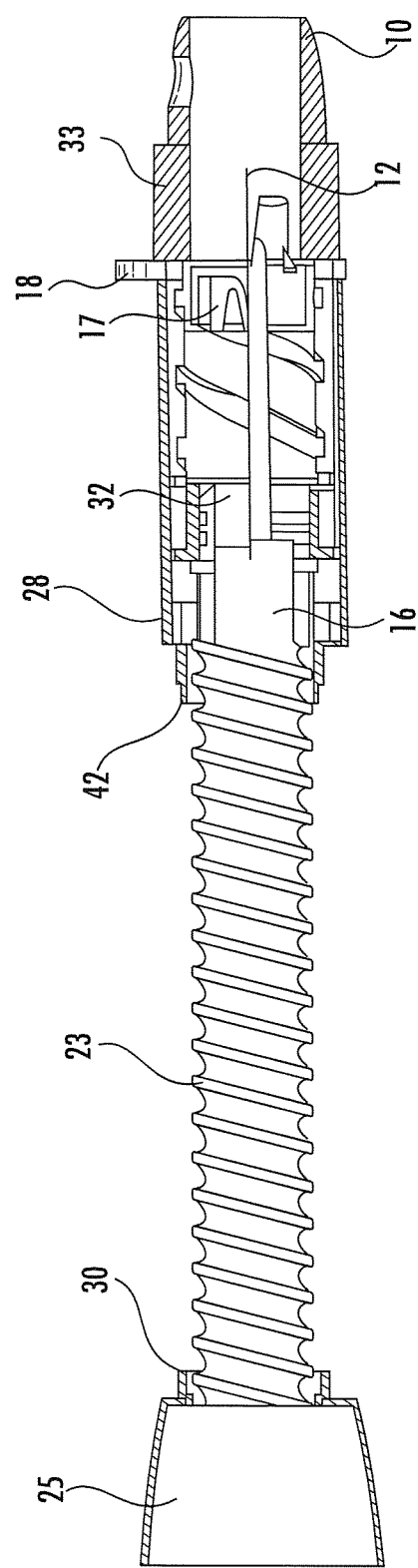
FIG. 7 is a side section view showing an embodiment having an expandable member, wherein the expandable member is in its extended position.

As shown best in FIGS. 4a and 7, in some embodiments an expandable member 23 is combined with the first housing portion 28. The expandable member 23 has an opening in a wall in fluid communication with the opening in the wall of the housings 28, 33 to allow air to pass through the expandable member 23 as it passes between the mouthpiece 10 and the outlet end 25. The expandable member 23 may be any suitable shape, including tubular and rectangular prism. The shape of the expandable member 23 may be the same as the shape of the housing 28 to allow the outer surface of the expandable member 23 to rest against the internal surface of the housing 28. The expandable member 23 is made from a flexible and elastic material such as rubber. The expandable member 23 has a first position wherein it is retracted (FIG. 4a) and a second position wherein it is extended (FIG. 7). In some embodiments the expandable member 23 has an outer surface with a diameter smaller than the outer diameter of the first housing portion 28 thereby allowing the expandable member 23 to be nested inside the solid body first housing portion 28 in its first position as shown in FIG. 4a. In its second position at least a portion of the expandable member 23 is pulled outside of the first housing portion 28 as shown in FIG. 7 such that the outer surface of the expandable member 23 is not within the first housing portion 28. Extending the expandable member 23 to its second position increases the volume of the chamber downstream from the reed 12 by increasing the distance the air must travel between the mouthpiece 10 and the outlet 25. This increased chamber volume lowers the tone created by the animal call device. In some embodiments the expandable member 23 is biased in its first position so that it retracts inside the first housing portion 28 when the user no longer exerts a pulling force on the outlet end 25.

A first end of the expandable member 23 is combined with any upstream portion of the animal call, preferably at a point immediately downstream from the reed 12. The second end of the expandable member 23 is combined with the outlet end 25 of the housing 28. The outlet end 25 is separable from the main housing member (the portion of the housing 28 between the outlet end 25 and the mouthpiece 10 is referred to herein as the main housing member). The upstream end of the outlet end 25 mates with the downstream end of the first housing portion 28 when the expandable member 23 is in its first position. As shown in FIG. 7, in some embodiments the upstream portion of the expandable member 23 is combined with the first housing portion 28 near the reed support member 16 and the downstream portion of the expandable member 23 is combined with the outlet end 25. In these embodiments the outlet end 25 is made from a hard material which may be the same material as the first housing portion 28. The outlet end 25 has a lip or seat 30 which has a diameter larger than the diameter of the downstream end of the first housing portion 28 so it is adapted to receive the rim 42 of the downstream end of the first housing portion 28. When combined, the seat 30 and rim 42 form an airtight seal between the two components so they effectively function as one solid body. In another embodiment the components are reversed so the larger diameter seat is on downstream end of the first housing portion 28 and the smaller diameter rim is on the upstream end of the outlet end 25. In another embodiment the upstream end of the outlet end 25 and the downstream end of the first housing portion 28 are machine tapered to be self holding. In one embodiment the machine taper is a Morse taper. The biasing force of the expandable member 23 pulling the outlet end 25 toward the first housing portion 28 causes the separate components 25, 28 to create a seal (FIG. 4a) such that the entirety of the first housing portion 28 and outlet end 25 function as a solid body grunt tube unless the user applies force to pull the outlet end 25 away from the first housing portion 28 as shown in FIG. 7.

In an alternate embodiment at least a portion of the expandable member 23 is outside of the housing 28 even when the expandable member 23 is in its first (retracted) position. In this alternate embodiment the grunt call is not completely enclosed by a solid body housing when the expandable member 23 is in its first position.

The sounds produced by the grunt call can be varied in several ways. First, the user can partially or completely cover the outlet end 25 to change the pitch. Second, the length of the device may be varied by extending or retracting the expandable member 23 to change the length of the internal opening to change the pitch. The flexibility of the expandable member 23 also allows the direction of the sound to be varied by flexing or bending the expandable member 23 when it is in its extended position so the outlet end 25 directs sound in a direction other than along the longitudinal axis of the animal call. Third, the user can invert the grunt call and produce different sounds by inhaling through the outlet end 25 of the call instead of exhaling through the mouthpiece 10.

Another way to vary the sound of the call is to change the effective length of the reed 12 by moving the adjustment member 17 along the reed 12. In one embodiment the adjustment member 17 is a curved rigid resilient member having a first position wherein the arm 17 is lax and a second position wherein the arm 17 is compressed. The arm 17 is biased in its first position. The adjustment member 17 is combined with the first housing portion 28 such that the arm 17 is compressed to its second position. The resiliency of the arm 17 trying to return to its first position exerts force against the reed 12 to change the effective length of the reed 12. The adjustment member 17 has a contact end 19 which frictionally engages the reed 12 and presses the reed 12 against the sound board 14.

Figure 5:
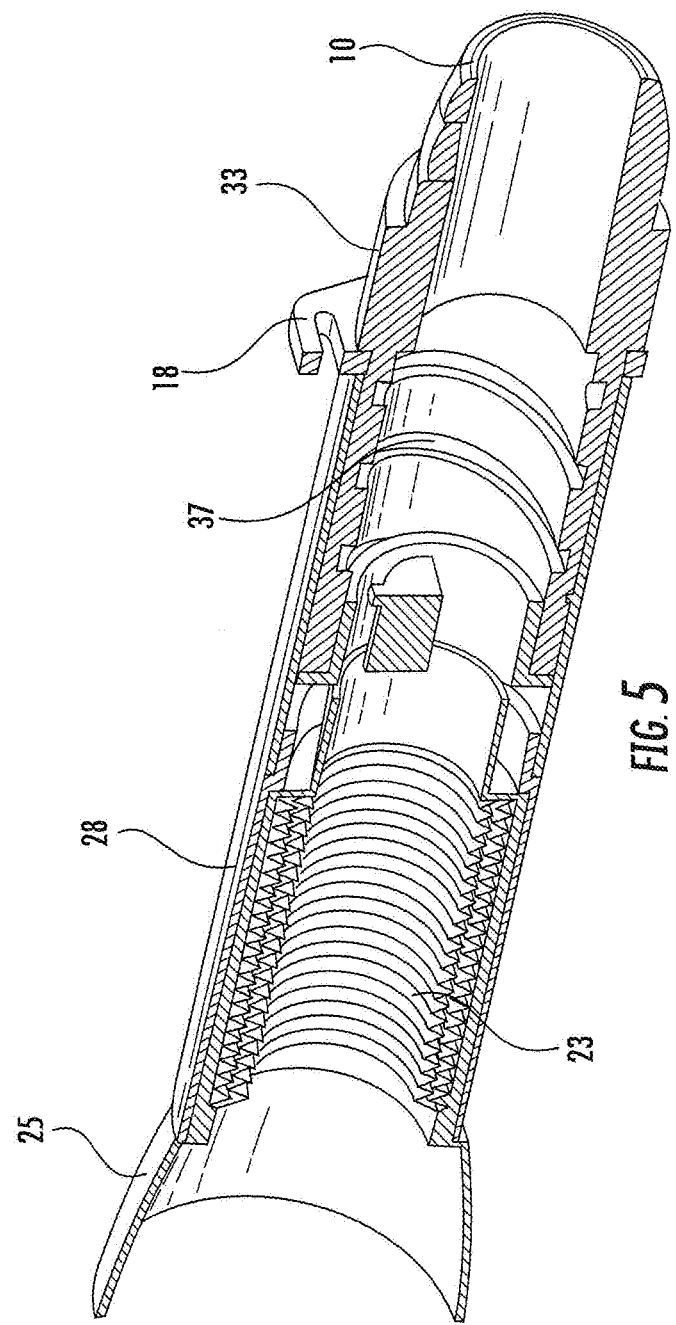
FIG. 5 is a section view of an embodiment of the grunt tube wherein the reed and other internal parts of the adjustment member have been removed to show helical member in the walls of the second housing portion.
Figure 9:
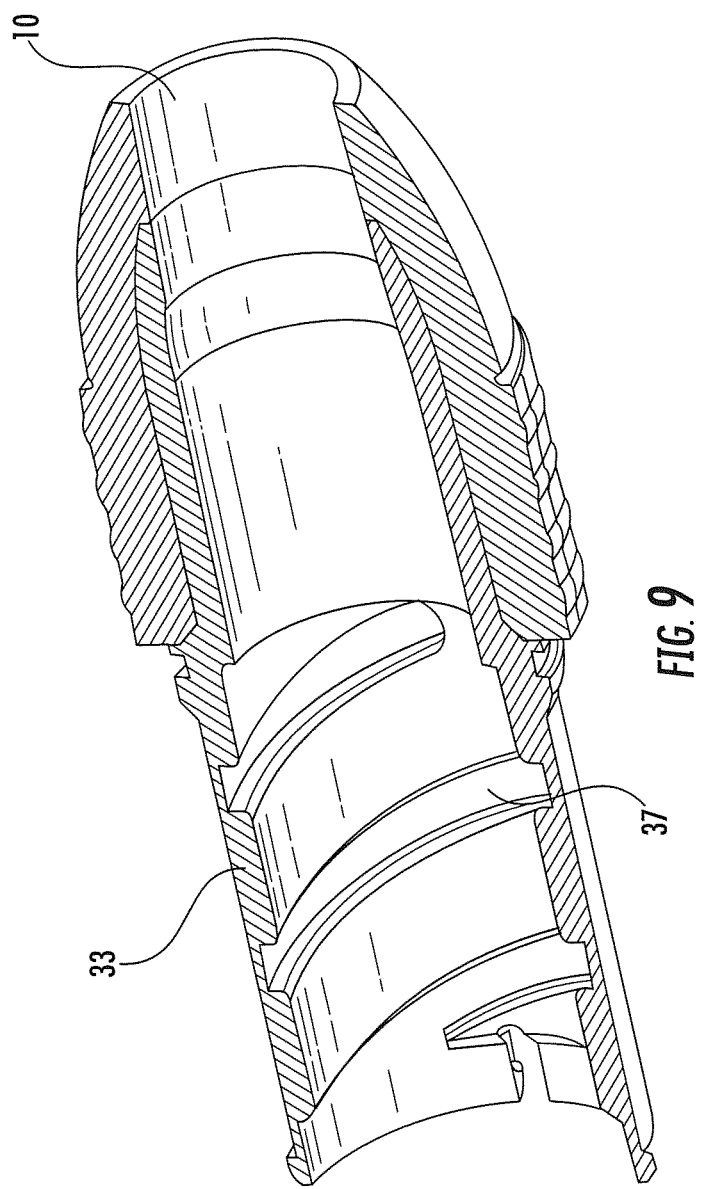
FIG. 9 is a section view of an embodiment showing the second housing portion.
Figure 10:
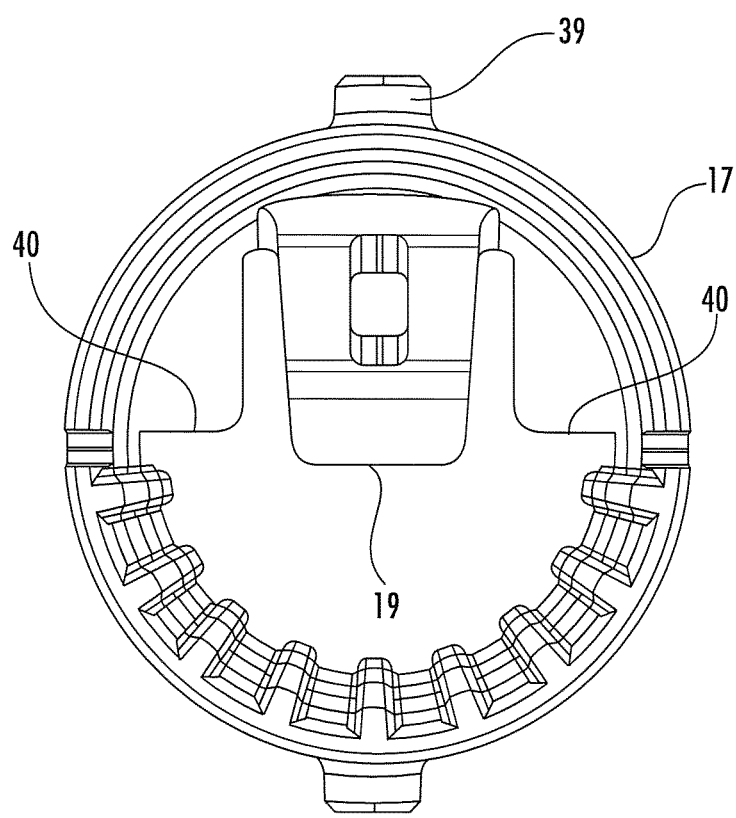
FIG. 10 is an end view of the adjustment member.
Figure 11:
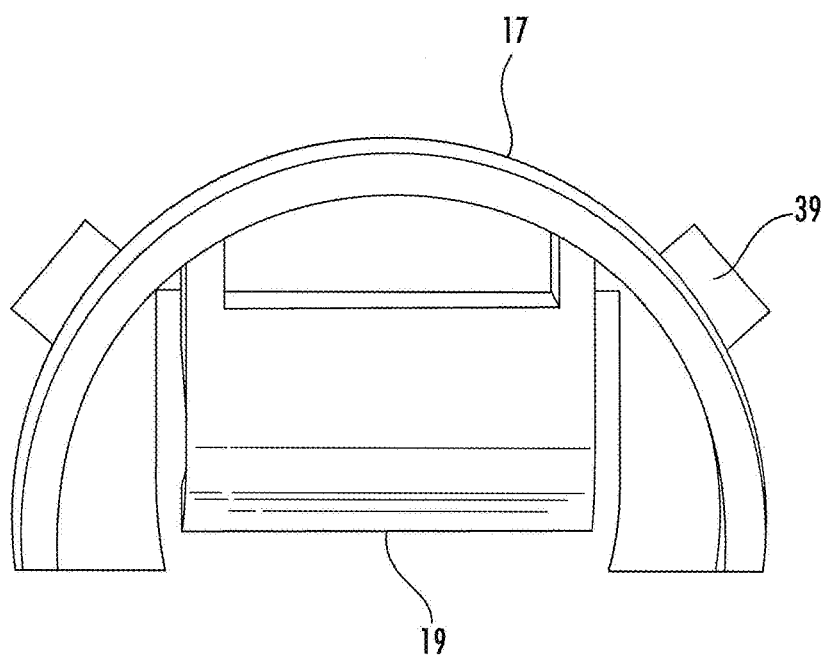
FIG. 11 is an end view of an alternate embodiment of the adjustment member.

The adjustment member 17 has at least one helical engagement member 39 extending outwardly therefrom as shown best in FIGS. 6, 10, and 11. The helical engagement member 39 engages helical member 37 formed along the inside surface of the second housing, portion 33. The helical member 37 may be helical fighting extending from the inside surface of the second housing portion 33 or, as shown in FIGS. 5 and 9, the helical member 37 may be a helical groove formed in the inside surface of the second housing portion 33. Rotation of the second housing portion 33 relative to the first housing portion 28 causes linear movement of the adjustment member 17 along the length of the reed 12 as the helical member 37 functions like an auger to, move the adjustment member 17 linearly. In the embodiment shown a portion of the second housing portion 33 forms an outer surface of the device to allow the user to manually twist the second housing portion 33 relative to the first housing portion 28. In an alternate embodiment another mechanical means may be used to rotate the second housing portion 33. For example, in one alternate embodiment a lever or slide is positioned on the outside of the device and is adapted to move linearly to cause the second housing portion 33 to rotate. Portions of the adjustment member 17 contact the reed 12 and/or sound board 14 to prevent the adjustment member 17 from rotating with the second housing portion 33 as described below in more detail. This allows the helical members 37 to push the helical engagement member 29/adjustment member 17 along the length of the reed 12 in an auger-like fashion as the second housing member 33 is rotated instead of allowing the adjustment member 17 to rotate with the second housing portion 33.

Figure 8:
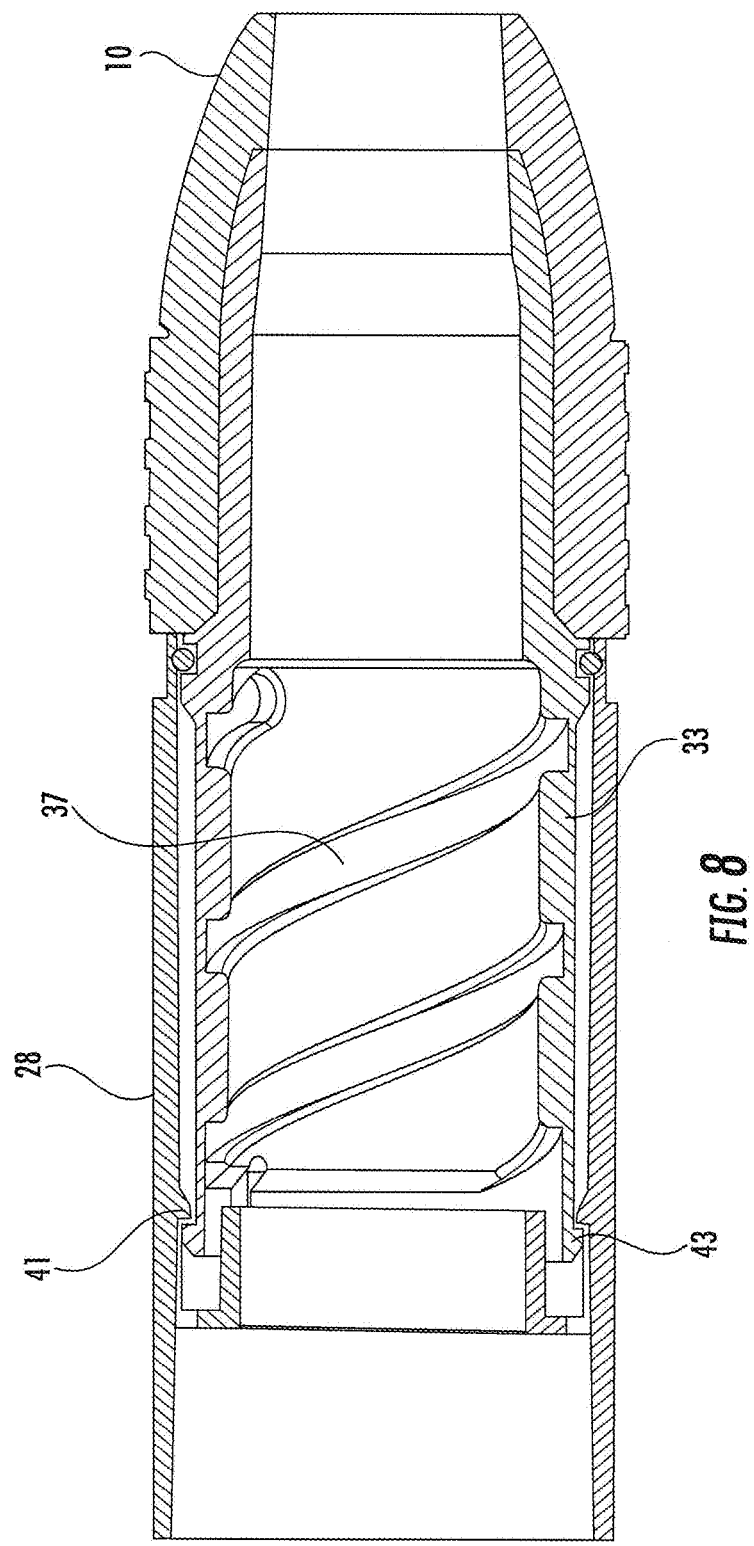
FIG. 8 is a side section view of an embodiment showing the snap connection between the first housing portion and the second housing portion.

FIG. 8 is a section view showing the second housing portion 33 combined with the first housing portion 28 so that the two portions rotate relative to one another but do not move longitudinally relative to one another. In the embodiment shown, the inner surface of the first housing portion 28 has an inwardly protruding flange 41 and the outer surface of the second hosing portion 33 has an outwardly protruding flange 43. Except for the diameters of the flanges 41, 43, the external diameter of the second housing portion 33 is smaller than the internal diameter of the first hosing portion 28. The second housing portion 33 is inserted into the first housing portion 28 until flanges 41, 43, are forced past each other to snap the two housing portions 28, 33 together. This allows the housing portions 28, 33 to remain connected and not move longitudinally relative to one another even as the second housing portion 33 is rotated to move the adjustment member 17 along the reed 12. It should be noted that in an alternate embodiment the components are reversed such that the first housing portion 28 comprises the helical members 37 along its inside surface and is smaller in diameter than the second housing portion 33 and the second housing portion 33 is combined with the reed 12.

As shown best in FIG. 10, the adjustment member 17 includes one or more features which prevent it from rotating along with the second housing portion 33 since rotation of the adjustment member 17 with the second housing portion 33 would prevent longitudinal movement. In one embodiment the contact end 19 of the adjustment member 17 has a predetermined length in a direction generally perpendicular to the length of the reed 12. The predetermined length may be any suitable length to engage the reed 12 to modify its effective length and to prevent the adjustment member 17 from rotating with the second housing portion 33. In some embodiments the predetermined length is between 10% and 100% of the width of the reed 12. In another embodiment the adjustment member 17 includes one or more flanges 40 each having a surface extending a predetermined length in a direction generally perpendicular to the length of the reed 12. The surface of the flanges 40 are adapted to engage the reed 12 and/or the outer edges of the sound board 14 to prevent the adjustment member 17 from rotating with the second housing portion 33.

FIG. 11 is an end view of an alternate embodiment of the adjustment member 17. In this embodiment the adjustment member 17 is not a full circle so it does not completely surround the reed 12. In this embodiment the adjustment member 17 may be "C" shaped or semi-circular.

In some embodiments at least a portion of the first housing portion 28 is covered by a soft skin such as an elastic or synthetic or natural rubber. The skin material has a non-reflective matte black finish. In addition to reducing reflections, the rubber material also minimizes any sounds produced by incidental contact between the grunt call and other objects, such as, e.g., a hunter's weapon.

As shown best in FIG. 2, some embodiments include an opening in one of the housings 28, 33 adapted to receive a lanyard to allow the user to easily carry the device around his/her neck.

FIG. 12 shows a perspective view of the animal call wherein the outlet end 25 has an opening which approximates the size and shape of the housing 28. FIG. 13 shows a similar perspective view of a different embodiment wherein the size of the opening in the outlet end 25 is reduced by a partial wall 49 having a smaller opening 44 to restrict the rate at which air and sound leave a chamber created downstream of the reed 12 and upstream from the wall 49. The longer residence time of the sound waves in the chamber helps to create a deeper sound. In one embodiment the size of the opening 44 is smaller than the cross sectional area of the housing 28 and is adjustable by the user. In this embodiment the opening 44 may be adjusted to be larger for a higher tone and smaller for a deeper tone. In one embodiment the size of the opening 44 is controlled by a means similar to an iris diaphragm in a camera wherein actuation by the user (such as rotation of a portion of the device) causes a plurality of blades to move between a smaller (or closed) opening and a larger opening. In another embodiment a member 46 such as a thin plate as shown in FIG. 13a is rotatably combined with the device near the opening 44 so the plate 46 is adjacent the wall through which the opening 44 passes. The plate 46 has one or more openings of varying sizes. The plate 46 can be rotated so that openings of different sizes in the plate 46 align with the opening 44 at different times so the user can adjust the size of the opening 44 by adjusting the position of the plate 46. The opening 44 and the pivot axis of the plate 46 may be off center with respect to the other so that rotating the plate 46 causes its different openings to align with the opening 44. In another embodiment a member 48 such as a thin plate as shown in FIG. 13b is rotatably combined with the device near the opening 44 so the plate 48 is adjacent the wall through which the opening 44 passes. The plate 48 has a single triangular or spiral shaped opening having a varying height along its length. The plate can be rotated so that different the height of the opening in the plate 48 aligns with the opening 44 so the user can adjust the size of the opening 44 by adjusting the position of the plate 48. The opening 44 and the pivot axis of the plate 48 may be off center with respect to the other so that rotating the plate 48 causes its different heights to align with the opening 44.

To use the device a user passes air into the mouthpiece 10 end of the first housing portion 28 as is known in the art. The reed 12 vibrates in response to the passing air to create an audible sound which is emitted from the outlet 25 end of the device. The reed 12 is secured to a sound board 14 in the first housing portion 28 by placing the reed 12 on the sound board 14 then placing a wedge 32 on top of the reed 12 and into an opening where the wedge 32 is frictionally secured by the walls of the opening. The reed 12 is sandwiched between the wedge 32 and the support member 16 and/or sound board 14. The sound emanating from the outlet 25 end is modified by rotating the second housing portion 33 relative to the first housing portion 28 which causes the adjustment member 17 to move along the length of the reed 12 to change the vibrational characteristics of the reed 12. The second housing portion 33 may be manually rotated by the user or another type of mechanical means (such as a lever or slide) may be actuated by the user to rotate the second housing portion 33. The reed 12 remains stationary relative to the second housing portion 33 since the reed 12 is combined with the first housing portion 28. The adjustment member 17 is disposed inside the second housing portion 33 so that the helical engagement member(s) 39 are received in the helical members 37 formed in the inside surface of the second housing portion 33. Rotation of the second housing portion 33 causes the adjustment member 17 to travel axially along the length of the reed 12 causing the contact end 19 of the adjustment member 17 to contact the reed 12 at a different location. This modifies the sound produced by changing the effective length of the reed 12. The expandable member 23 has a first position wherein it is nested inside the first housing portion 28 and a second position wherein a portion extends outside of the first housing portion 28. The expandable member 23 is biased in its first position so that it retracts inside the first housing portion 28 when the user no longer exerts a pulling force on the outlet 25 end. The expandable member 23 may be moved to its extended position to increase the distance between the mouthpiece 10 end and the outlet 25 end which modifies the sound emitted. In its extended position the user may bend or flex the expandable member 23 to modify the direction of sound emitted from the outlet 25 end.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. An animal call comprising:
  a housing having a first housing portion rotatably combined with a second housing portion;
  an opening in a wall of the housing between a mouthpiece and an outlet end;
  a reed combined with the first housing portion, said reed having a length and being adapted to vibrate in response to passing air;
  a helical member formed along an inside surface of the second housing portion; and
  an adjustment member having a helical engagement member engaged with the helical member and an adjustment arm in frictional engagement with the reed, said adjustment member adapted to move along the length of the reed as the second housing portion is rotated relative to the first housing portion.

2. The animal call of claim 1 wherein the first housing portion is combined with the outlet end.

3. The animal call of claim 1 wherein the second housing portion is combined with the mouthpiece.

4. The animal call of claim 1 further comprising an expandable member having a first position and a second position, wherein in the first position at least a portion of the expandable member is nested inside the housing and in the second position at least a portion of the expandable member extends outside of the housing.

5. The animal call of claim 1 further comprising a sound board combined with the first housing portion for supporting the reed.

6. The animal call of claim 5 wherein the adjustment member includes a flange having a surface adapted to engage one of the reed and the sound board for preventing the adjustment member from rotating along with the second housing portion.

7. The animal call of claim 1 further comprising a chamber formed downstream from the reed and upstream from a wall having an opening near the outlet end.

8. An animal call comprising:
a housing having a first housing portion rotatably combined with a second housing portion;
an opening in a wall of the housing between a mouthpiece and an outlet end;
a reed combined with the first housing portion, said reed having a length and being adapted to vibrate in response to passing air;
a helical member formed along an inside surface of the second housing portion;
an adjustment member having a helical engagement member engaged with the helical member and an adjustment arm in frictional engagement with the reed, said adjustment member adapted to move along the length of the reed as the second housing portion is rotated relative to the first housing portion; and
an expandable member having a first position and a second position, wherein in the first position at least a portion of the expandable member is nested inside the housing and in the second position at least a portion of the expandable member extends outside of the housing.

9. The animal call of claim 8 wherein the first housing portion is combined with the outlet end.

10. The animal call of claim 8 wherein the second housing portion is combined with the mouthpiece.

11. The animal call of claim 8 wherein the expandable member is biased in the first position.

12. The animal call of claim 8 wherein the expandable member has a first end combined with an upstream portion of the animal call and a second end combined with the outlet end, wherein the outlet end is separated from the housing when the expandable member is in the second position.

13. The animal call of claim 12 wherein the outlet end has a seat adapted to receive a rim portion of the housing to create a seal when the expandable member is in the first position.

14. The animal call of claim 8 wherein the expandable member is bendable.

15. The animal call of claim 8 wherein the housing is made from hard plastic polymer.

16. An animal call comprising:
a housing having a first housing portion rotatably combined with a second housing portion, wherein the first housing portion includes an outlet end and the second housing portion includes a mouthpiece;
an opening in a wall of the housing between the mouthpiece and the outlet end;
a reed that vibrates in response to passing air, said reed having a length and being disposed within said first housing portion,
wherein the second housing portion further includes an internal surface having a helical member therein; and
an adjustment member having a helical engagement member engaged with the helical member and an adjustment arm in frictional engagement with the reed, said adjustment member adapted to move along the length of the reed as the second housing portion is rotated relative to the first housing portion.

17. The animal call of claim 16 further comprising a chamber formed downstream from the reed and upstream from a wall having an opening near the outlet end.

18. The animal call of claim 17 wherein the opening in the wall has a size that is less than a cross sectional area of the housing and the size of the opening is adjustable.

19. A method of using an animal call to produce a sound, said animal call having a reed with a first contact point and a second contact point, said reed disposed within an elongated housing having a first housing portion which rotates relative to a second housing portion, wherein the second housing portion has a helical member formed therein, a mouthpiece end, an outlet end, and an adjustment member having a helical engagement member engaged with the helical member and a reed engagement member in frictional engagement with the reed at the first contact point, said method comprising:
conveying air through said mouthpiece end and past said reed, thereby causing said reed to vibrate and to produce sounds that emanate from said outlet end; and
selectively rotating the second housing portion relative to the first housing portion to cause the adjustment member to move from the first contact point against the reed to the second contact point against the reed to modify the sound.

20. The method of claim 19 wherein the animal call further comprises an expandable member having a first end combined with an upstream portion of the animal call and a second end combined with the outlet end, and wherein the method further comprises moving the expandable member from a first position nested inside the elongated housing to a second position, wherein at least a portion of the expandable member extends outside of the elongated housing in the second position.

* * * * *